(12) United States Patent
Sakurai

(10) Patent No.: US 8,773,717 B2
(45) Date of Patent: Jul. 8, 2014

(54) INFORMATION PROCESSING APPARATUS, INFORMATION PROCESSING METHOD, AND STORAGE MEDIUM FOR ADDING CHECK OPERATION TO INSTRUCTION BASED ON ERROR INFORMATION ACQUIRED

(75) Inventor: Masakatsu Sakurai, Toride (JP)

(73) Assignee: Canon Kabushiki Kaisha, Tokyo (JP)

( * ) Notice: Subject to any disclaimer, the term of this patent is extended or adjusted under 35 U.S.C. 154(b) by 184 days.

(21) Appl. No.: 13/355,344

(22) Filed: Jan. 20, 2012

(65) Prior Publication Data

US 2012/0200865 A1    Aug. 9, 2012

(30) Foreign Application Priority Data

Feb. 3, 2011 (JP) ................................. 2011-021937

(51) Int. Cl.
*H04N 1/60* (2006.01)
*G06K 15/02* (2006.01)

(52) U.S. Cl.
USPC .......................................... 358/1.9; 358/1.13

(58) Field of Classification Search
None
See application file for complete search history.

(56) References Cited

U.S. PATENT DOCUMENTS

| | | | |
|---|---|---|---|
| 2002/0126309 A1* | 9/2002 | Shimada | 358/1.14 |
| 2003/0164971 A1* | 9/2003 | Kidani et al. | 358/1.13 |
| 2004/0036908 A1* | 2/2004 | Yagita et al. | 358/1.15 |
| 2008/0239400 A1* | 10/2008 | Yoshida | 358/3.01 |
| 2009/0279137 A1* | 11/2009 | Mori | 358/1.15 |
| 2009/0279139 A1* | 11/2009 | Miyata | 358/1.15 |
| 2010/0014132 A1* | 1/2010 | Kato | 358/530 |
| 2010/0231944 A1* | 9/2010 | Takahashi | 358/1.13 |

FOREIGN PATENT DOCUMENTS

JP     2009-137150 A     6/2009

* cited by examiner

*Primary Examiner* — Qian Yang
(74) *Attorney, Agent, or Firm* — Canon USA, Inc., IP Division

(57) ABSTRACT

An information processing apparatus includes a check unit, an acquisition unit, a first determination unit, and an output unit. The check unit checks a processing status of a printing apparatus. The acquisition unit acquires exception processing information including a content of exception processing from the printing apparatus in response to the processing status checked by the check unit being in execution of the exception processing. The first determination unit determines a check operation to be added to a physical job ticket according to the exception processing content included in the exception processing information acquired by the acquisition unit. The output unit outputs the physical job ticket including the check operation determined by the first determination unit.

13 Claims, 18 Drawing Sheets

FIG. 6
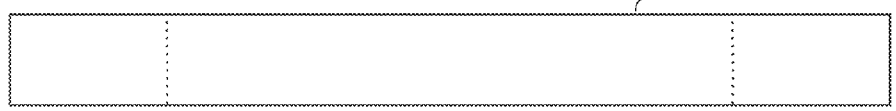
501 WRAPPER BAND
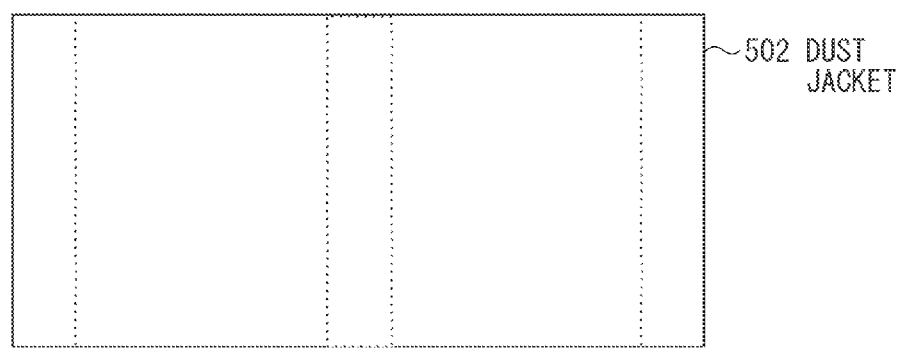
502 DUST JACKET
504 SPINE
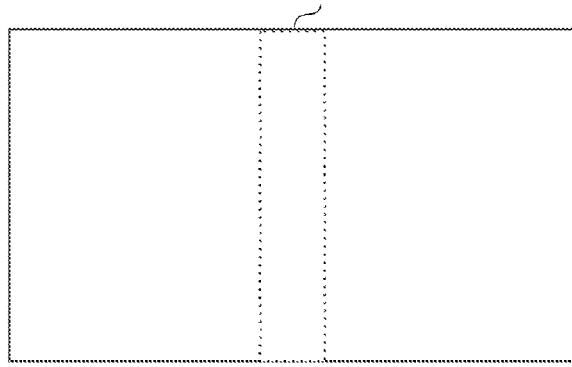
503 COVER
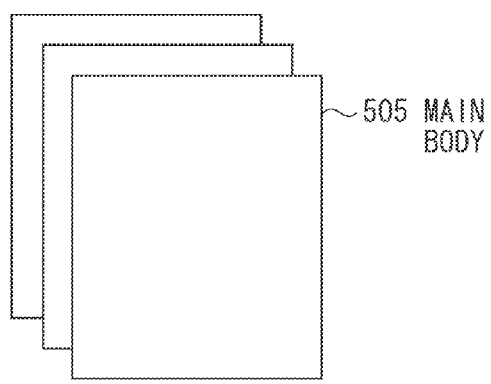
505 MAIN BODY FIG. 7
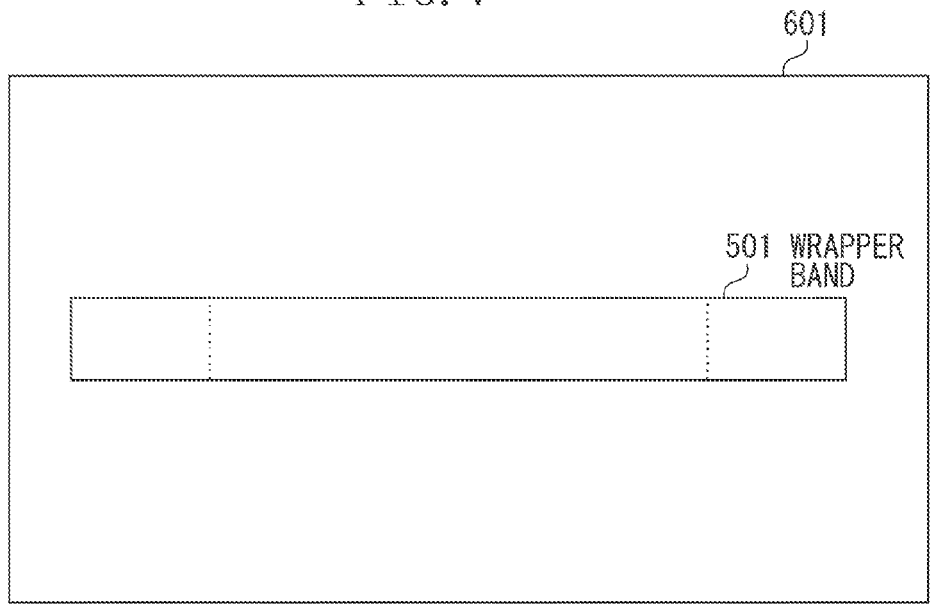
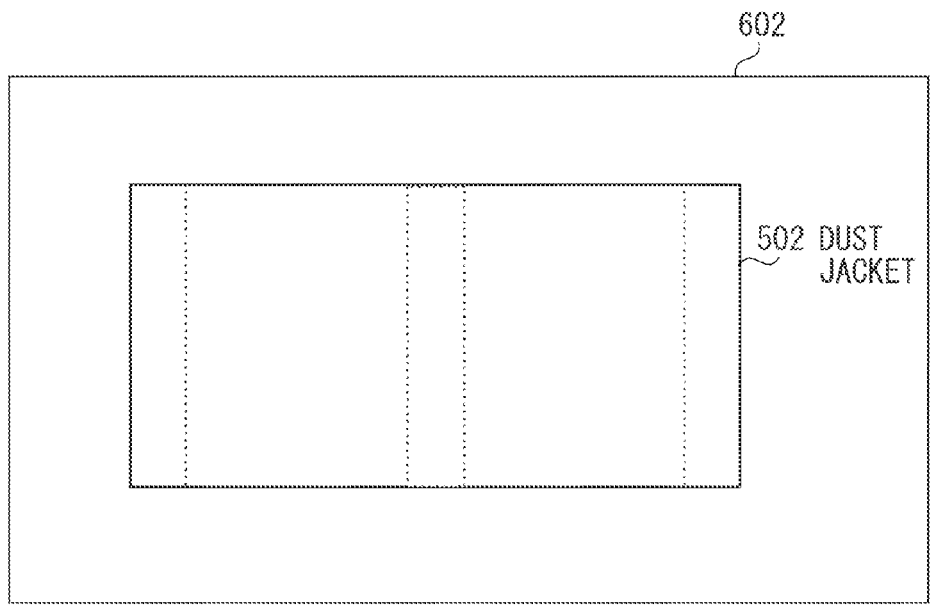

FIG. 15

| | |
|---|---|
| PRINTING PROCESS — 1401 | DETAILED INSPECTION REQUIRED CONDITIONS — 1402 |
| PRINTING OF WRAPPER BAND — 1403 | SHEET REPLENISHMENT AND CUTTING PROCESS — 1404 |
| PRINTING OF DUST JACKET — 1405 | SHEET REPLENISHMENT AND LAMINATION PROCESS — 1406 |
| PRINTING OF COVER — 1407 | SHEET REPLENISHMENT AND CUTTING PROCESS — 1408 |
| PRINTING OF MAIN BODY — 1409 | JAM HANDLING PROCESS AND PERFECT BINDING PROCESS — 1410 |
| | TONER REPLACEMENT AND PERFECT BINDING PROCESS — 1411 |
| | CALIBRATION AND PERFECT BINDING PROCESS — 1412 |
| | SHEET REPLENISHMENT AND PERFECT BINDING PROCESS — 1413 |

FIG. 16

| | PROCESSING CONTENT | ADDITIONAL WORK TO PHYSICAL JOB TICKET |
|---|---|---|
| 1503 | JAM HANDLING PROCESS | CHECK THAT PRECEDING AND FOLLOWING PAGES OF X-TH SHEET (mm) ARE CONSECUTIVE |
| 1505 | TONER REPLACEMENT | CHECK THAT PRECEDING AND FOLLOWING PAGES OF X-TH SHEET (mm) HAVE NO COLOR CHANGE |
| 1507 | CALIBRATION | CHECK THAT PRECEDING AND FOLLOWING PAGES OF X-TH SHEET (mm) HAVE NO COLOR CHANGE |
| 1509 | SHEET REPLENISHMENT | CHECK THAT SHEET IS NOT CHANGED EVEN AFTER X-TH SHEET (mm) |

FIG. 17

| PAPER TYPE | COATED PAPER | MAT PAPER | HIGH QUALITY PAPER |
|---|---|---|---|
| THICKNESS (mm) | 0.09 | 0.115 | 0.13 |

FIG. 18

| REGULAR CHECK CONDITIONS | ADDITIONAL WORK TO PHYSICAL JOB TICKET |
|---|---|
| PRINTING OF W PAGES FROM PREVIOUS CALIBRATION | CHECK THAT PRECEDING AND FOLLOWING PAGES OF X-TH SHEET HAVE NO COLOR CHANGE (mm) |
| PRINTING OF W PAGES FROM PREVIOUS COLOR CHANGE CHECK | CHECK THAT PRECEDING AND FOLLOWING PAGES OF X-TH SHEET HAVE NO COLOR CHANGE (mm) |
| PRINTING OF W PAGES FROM PREVIOUS Z-TONER REPLACEMENT | CHECK THAT Z-TONER IS OUTPUT ON PRECEDING AND FOLLOWING PAGES OF X-TH SHEET (mm) |

INFORMATION PROCESSING APPARATUS, INFORMATION PROCESSING METHOD, AND STORAGE MEDIUM FOR ADDING CHECK OPERATION TO INSTRUCTION BASED ON ERROR INFORMATION ACQUIRED

BACKGROUND OF THE INVENTION

1. Field of the Invention

The present invention relates to an information processing apparatus, an information processing method, and a storage medium.

2. Description of the Related Art

Conventionally, the commercial printing industry receives orders from a third party (customer, client) for printed products (e.g., magazines, newspapers, catalogs, advertisements, photogravures), produces the desired output products for the clients, and delivers the products to the clients to receive payments for the products.

In such a commercial printing industry, a large-scale printing apparatus such as an offset printing machine is mainly used. The printing industry has proceeded with a variety of processes including a job entry, design or layout, comprehensive layout (presentation by printer output), proof reading (layout correction or color correction), proof (proof print), block copy preparation, printing, post-processing work, and shipment. In addition to the commercial printing industry, there is a market called print on demand (POD). The POD market competes with the commercial printing industry as an electrophotographic printing apparatus and an inkjet printing apparatus have enhanced processing speed and image quality thereof.

Such a POD market aims to deal with a large number of copies or a large number of jobs in a short delivery time without using a large-scaled apparatus or system. For example, the POD market has efficiently utilized a digital image forming apparatus such as a digital copying machine and a digital multifunction peripheral.

The POD market provides a digital print using electronic data, and thus the processes of the POD market tend to be managed and controlled by a computer compared to those of the conventional printing industry. In also the POD market, a workflow can be generated which includes a plurality of processes (e.g., pre-print processing process, print processing process, and post-print processing process) to obtain an output result.

Such processes are performed according to the workflow, so that an output result desired by a client is efficiently obtained. However, complications of processing contents to be executed in a post-print processing process may lead to a decrease in the number of operators who are capable of executing the post-print processing process in an appropriate manner. Such a decrease can cause a delay of a print job process. Moreover, there are cases where operators are allocated based on each processing process. In such cases, proper handover of one process to another from one operator to another is very important.

Accordingly, a post-processing physical job ticket for a finishing machine is generally printed so that many operators can execute the post-processing process. The post-processing physical job ticket describes a finishing process to be performed by a post-processing machine (also referred to as a finishing machine) subsequent to a sorting process. Herein, since the operators deal with a number of print jobs, a number of output products are output from an image processing apparatus.

In addition, a final stage of the post-processing process includes an inspection process for checking whether a printed product is produced as desired, for example, by checking printing errors, missing pages, and a finishing state. For example, Japanese Patent Application Laid-Open No. 2009-137150 discusses a technique for efficiently performing an inspection process by selecting an inspection operation to be prioritized and executed in response to a characteristic of print information to be input, producing inspection instruction information, and outputting the inspection instruction information.

When an error handling process is performed during a printing process of a product, there is a possibility that the product has a printing error. In such a case, therefore, an inspection process needs to be carefully performed on the product. However, when an operator of the printing process and an inspector of the inspection process are different persons, or when an error handling process is performed during mass printing, the operator or the inspector is unlikely to know what type of error handling process has been performed on which product, or what type of influences may be exerted on which product. Consequently, the printing error is unlikely to be found during the inspection.

In addition, there are cases where a printing error is found too late in the inspection process, causing a waste of processes that have been already performed or consumption of extra time for reworking the processes.

According to the above related-art technique, the point to be prioritized during the inspection process is generated based on the print information. However, the related-art technique does not consider a process for handling unforeseen events such as error occurrences during a printing process. Consequently, when an error is made in a product due to the printing error, the error is more unlikely to be found by the inspection process.

SUMMARY OF THE INVENTION

The present invention is directed to an information processing apparatus that can surely perform a check operation before performing a next process to improve work efficiency by suppression of reworking processes when exception processing such as an error handling process is performed or even when a printing error occurs.

According to an aspect of the present invention, an information processing apparatus includes a check unit configured to check a processing status of a printing apparatus, an acquisition unit configured to acquire exception processing information including a content of exception processing from the printing apparatus in response to the processing status checked by the check unit being in execution of the exception processing, a first determination unit configured to determine a check operation to be added to a physical job ticket according to the exception processing content included in the exception processing information acquired by the acquisition unit, and an output unit configured to output the physical job ticket including the check operation determined by the first determination unit.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 6 is a diagram illustrating an example of each component of a perfect bound product according to the exemplary embodiment.

FIG. 7 is a diagram illustrating print data of a wrapper band and print data of a dust jacket output from the printing apparatus.

FIG. 15 is a diagram illustrating an example of detailed inspection required conditions.

FIG. 16 is a diagram illustrating a processing content of a process to be generated in a printing process and a content of an additional work to the physical job ticket in response to the processing content.

FIG. 17 is diagram illustrating an example of information that defines a type and a thickness of paper.

FIG. 18 is a diagram illustrating an example of information that defines an item to be checked regularly during printing process.

DESCRIPTION OF THE EMBODIMENTS

Various exemplary embodiments, features, and aspects of the invention will be described in detail below with reference to the drawings.

Figure 1:
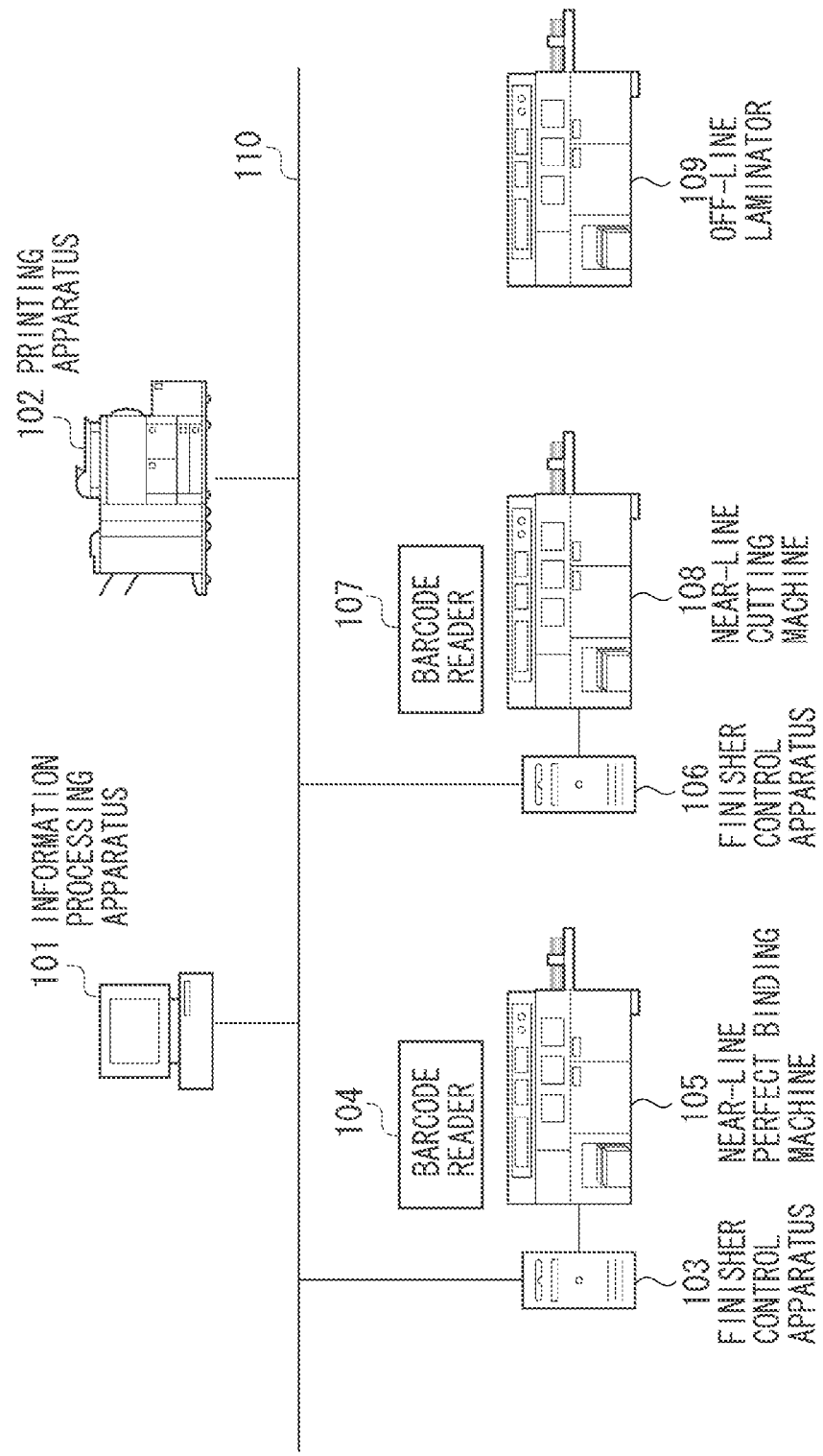
FIG. 1 is a diagram illustrating an example configuration of a system that generates a perfect bound product according to an exemplary embodiment.

FIG. 1 is a diagram illustrating an example configuration of a system that generates a perfect bound product according to an exemplary embodiment.

The system includes an information processing apparatus 101, a printing apparatus 102, a near-line perfect binding machine 105 serving as a post-processing apparatus, a near-line cutting machine 108 serving as a post-processing apparatus, and an off-line laminator 109 serving as a post-processing apparatus. Moreover, the system includes a finisher control apparatus 103 for controlling the near-line perfect binding machine 105, a barcode reader 104, which operates on the near-line perfect binding machine 105, a finisher control apparatus 106 for controlling the near-line cutting machine 108, a barcode reader 107, which operates on the near-line cutting machine 108, and a network 110.

Figure 2:
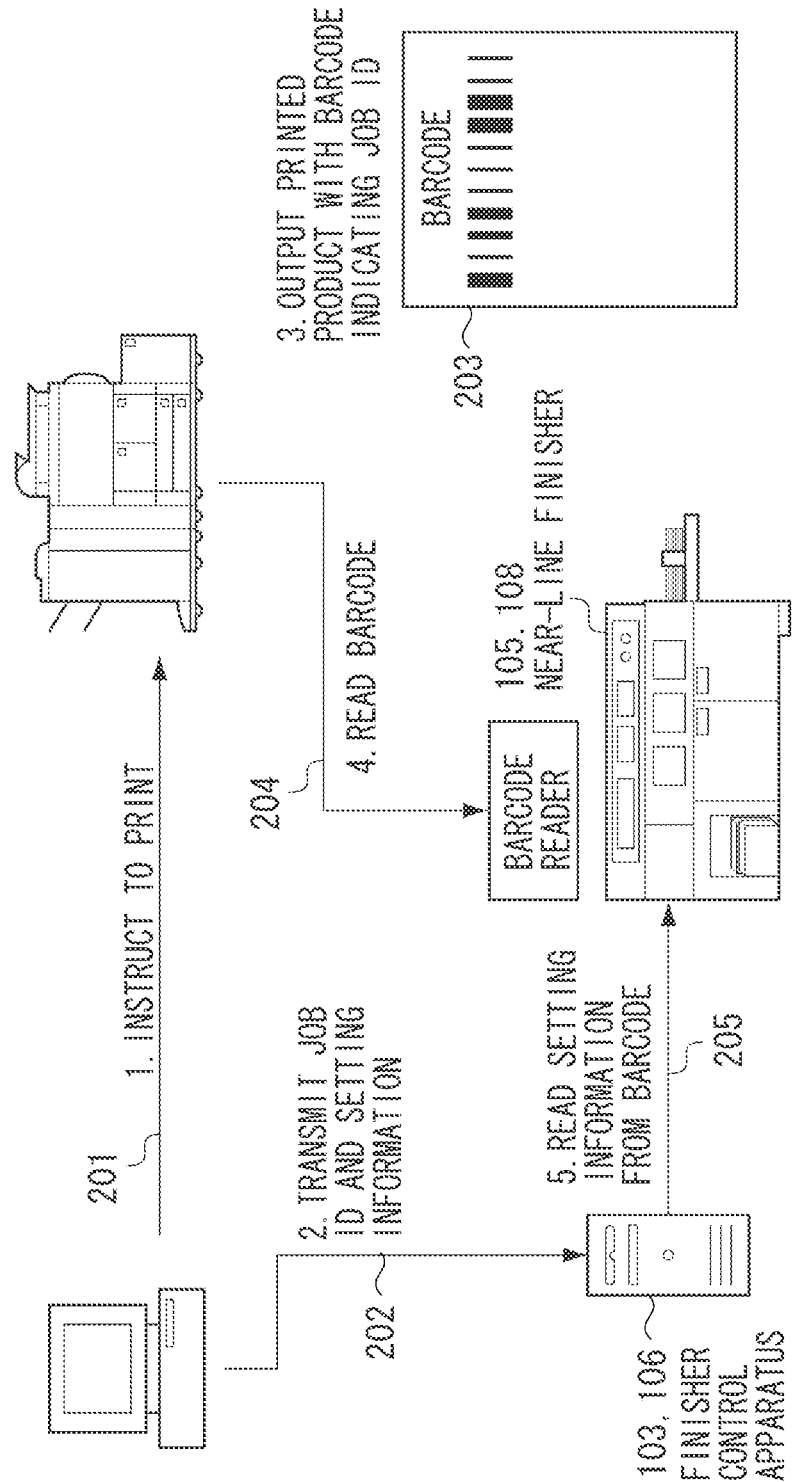
FIG. 2 is a diagram illustrating an example of detailed process flow of an information processing apparatus, a printing apparatus, a finisher control apparatus, a barcode reader, and a near-line perfect binding machine illustrated in FIG. 1.

FIG. 2 is a diagram illustrating and example of detailed process flow of the information processing apparatus 101, the printing apparatus 102, the finisher control apparatus 103, the barcode reader 104, and the near-line perfect binding machine 105 illustrated in FIG. 1. FIG. 2 illustrates the flow including the processes of the finisher control apparatus 103, the barcode reader 104, and near-line perfect binding machine 105. However, the entire flow including processes of the finisher control apparatus 106, the barcode reader 107, and the near-line cutting machine 108 can be substantially similar to the process flow illustrated in FIG. 2.

In FIG. 2, the information processing apparatus 101 instructs the printing apparatus 102 to print data (operation 201). Subsequently, the information processing apparatus 101 transmits finisher setting information and job identification (ID) to the finisher control apparatus 103 so that the near-line perfect binding machine 105 can operate (operation 202). The finisher setting information is correlated with the job ID to be transmitted simultaneously and stored in the finisher control apparatus 103.

The printing apparatus 102 outputs a printed product with a physical job ticket sheet on a first page, the physical job ticket sheet including the job ID transmitted to the finisher control apparatus 103 by operation 202 as a barcode (operation 203).

An operator who produces the perfect bound product carries the physical job ticket and the product output by operation 203 to the near-line perfect binding machine 105, so that the barcode reader 104 reads the barcode (indicating job ID) of the physical job ticket (operation 204).

The job ID read from the barcode reader 104 and the job ID transmitted to the finisher control apparatus 103 by operation 202 are collated, and the finisher setting information transmitted by operation 202 is loaded to the near-line perfect binding machine 105 to execute a finishing process according to the setting (operation 205).

Figure 3:
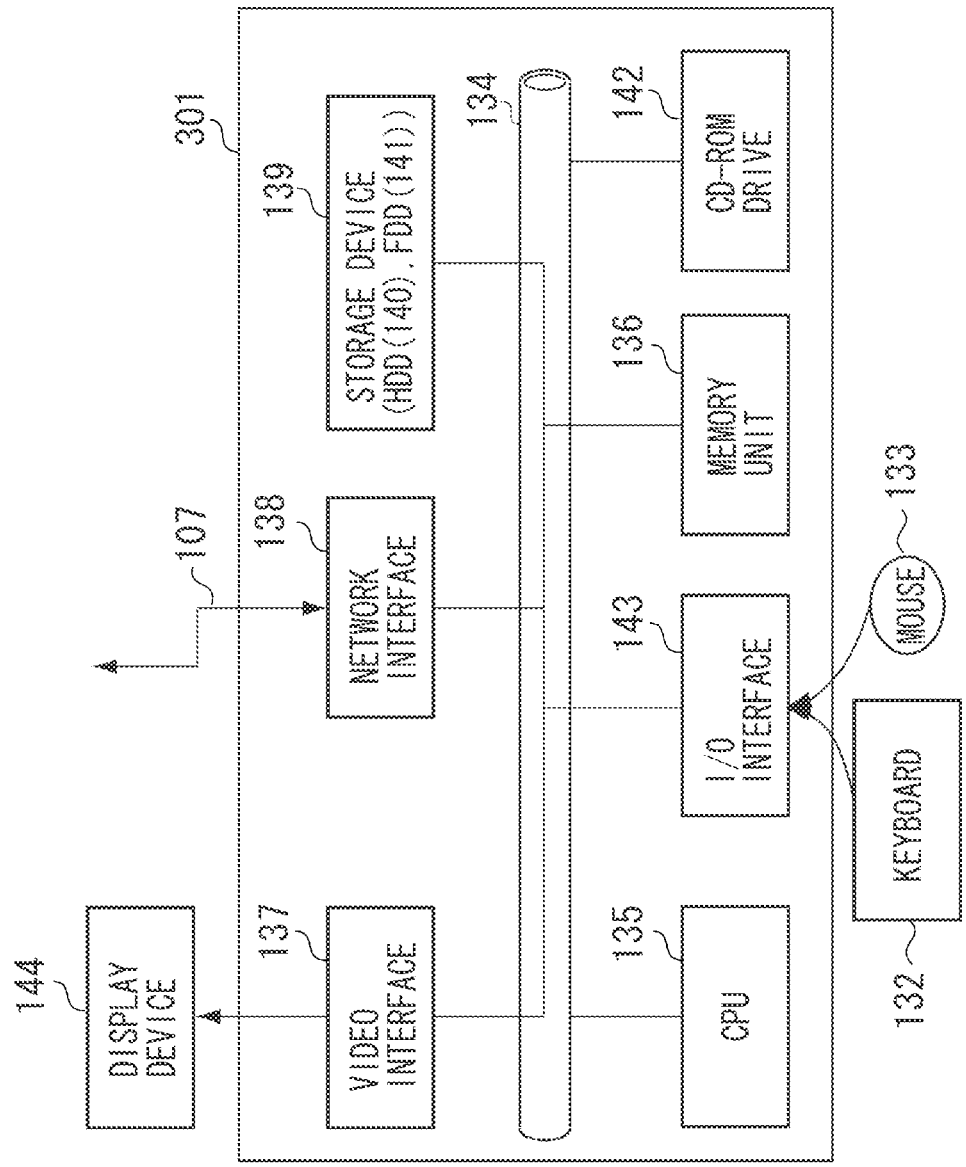
FIG. 3 is a diagram illustrating an example of a hardware configuration of the information processing apparatus according to the exemplary embodiment.

FIG. 3 is a diagram illustrating an example of a hardware configuration of the information processing apparatus 101 according to the present exemplary embodiment.

The information processing apparatus 101 is connected to an input device such as a keyboard 132 or a mouse 133 serving as a pointing device. The information processing apparatus 101 is also connected to a display device 144. A network interface 138 can connect the information processing apparatus 101 to another computer apparatus of the system through a network. A typical network connection is a local area network (LAN) or a wide area network (WAN). A typical configuration of the information processing apparatus 101 includes: a central processing unit (CPU) 135; a memory unit 136 including a random access memory (RAM) and a read only memory (ROM); an input/output (I/O) interface including a video interface 137; and an I/O interface 143 for the keyboard 132 and the mouse 133.

A storage device 139 includes a hard disk drive (HDD) 140 and a flexible disk drive (FDD) 141. The storage device 139 may include a magnetic tape drive (not shown). A compact disc read only memory (CD-ROM) drive 142 is provided as a non-volatile data source. For example, a finisher control program is stored in a readable medium including the storage device. The program is loaded from the readable medium of the computer and is executed by the CPU 135 of the information processing apparatus 101.

The CPU 135, therefore, executes a process based on a program such as the finisher control program, so that a software module can be provided and a process in a flowchart (described below) can be performed.

Figure 4:
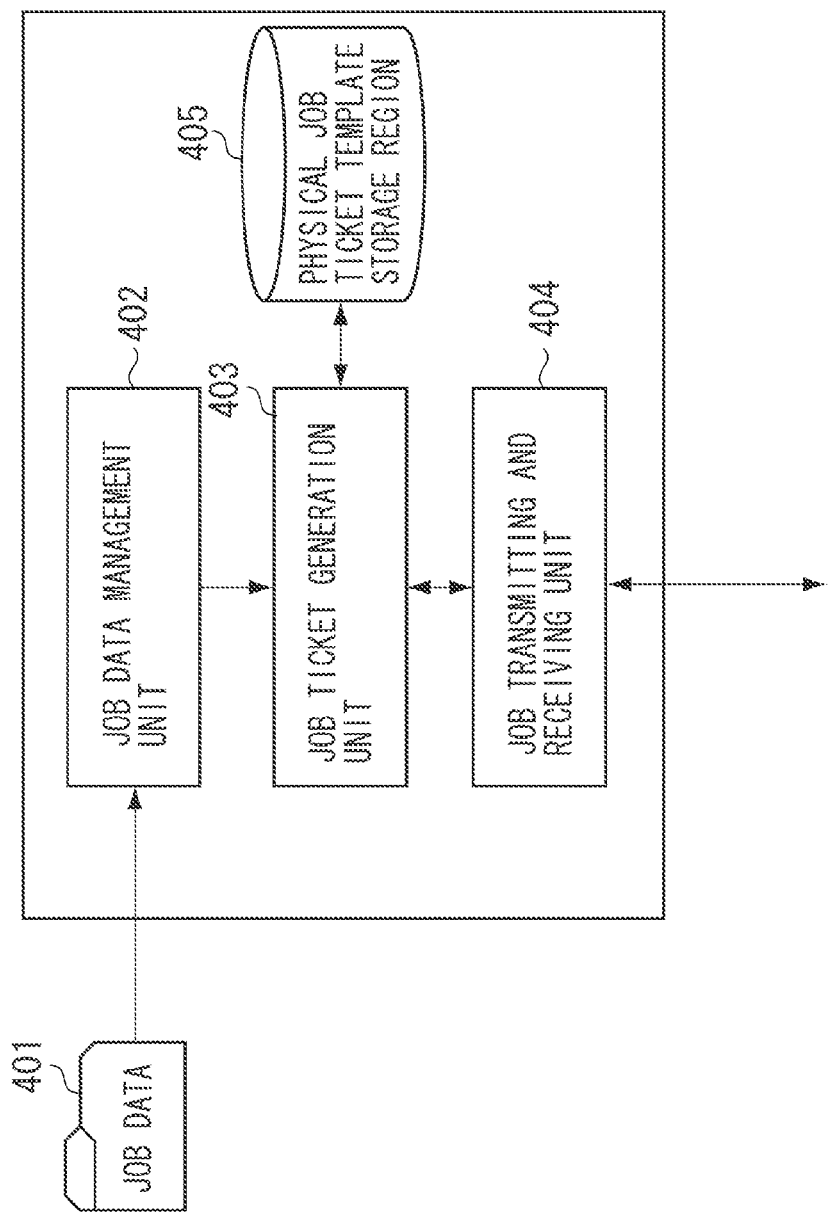
FIG. 4 is a diagram illustrating an example of a software module configuration of a finisher control program according to the exemplary embodiment.

FIG. 4 is a diagram illustrating an example of a software module configuration of the finisher control program according to the present exemplary embodiment.

In FIG. 4, job data 401 represents all the job data for processes to be performed by the present exemplary embodiment. For example, the job data 401 stores therein a file in which a job process and print data for each printing process are described. The job process is described below with reference to FIGS. 8 and 9. A job data management unit 402 reads and manages the job data 401. A job ticket generation unit 403 generates a physical job ticket from the job data, and regenerates a physical job ticket upon receipt of information from a job transmitting and receiving unit 404. The job transmitting and receiving unit 404 transmits the job data to the printing apparatus 102 and the finisher control apparatus 103. Moreover, the job transmitting and receiving unit 404 receives, for example, information on the number of printed sheets, remaining toner amount information, calibration execution information, remaining sheet amount information, and various error information from the printing apparatus 102 and the finisher control apparatus 103. A physical job ticket template storage region 405 stores therein a data template for the physical job ticket to be output to the printing apparatus 102.

Figure 5:
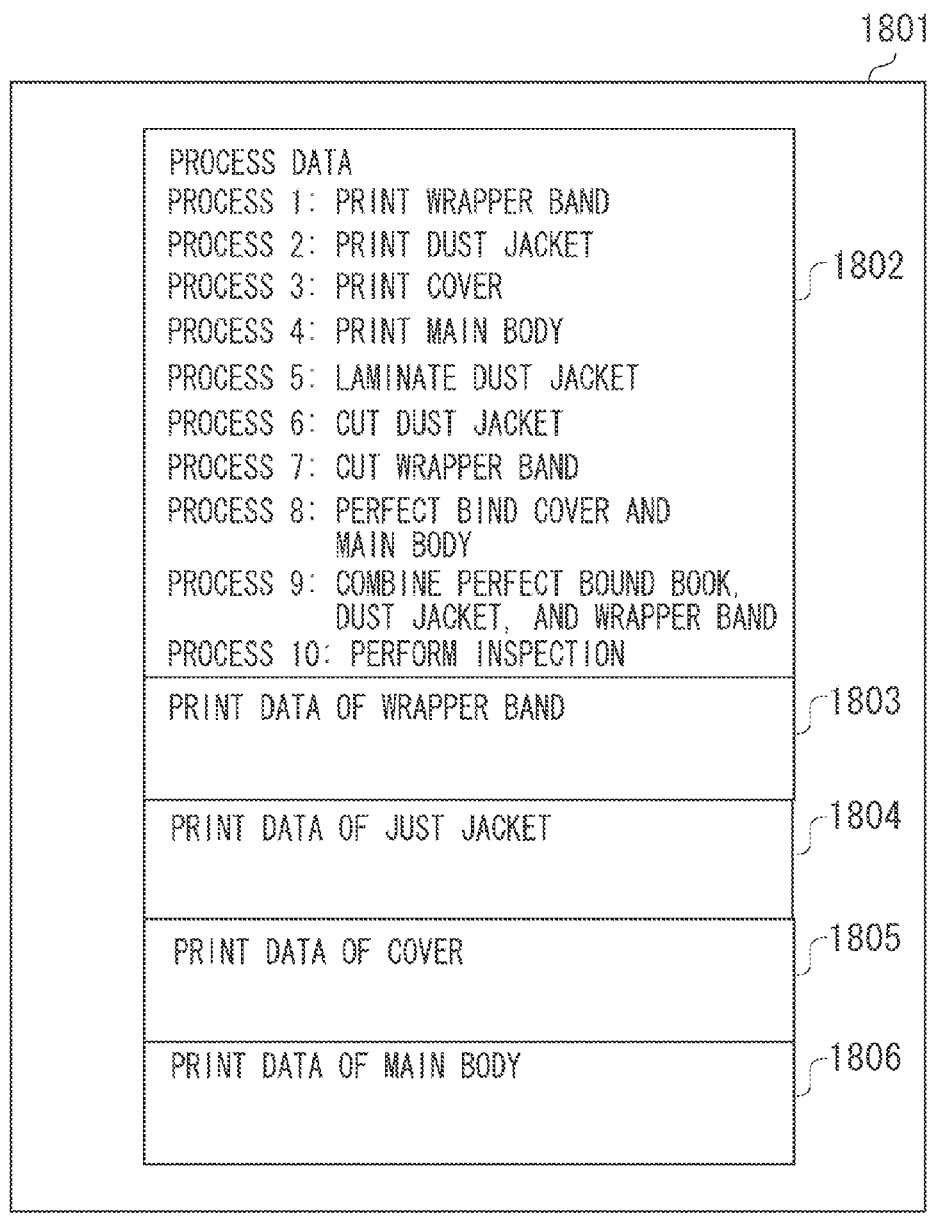
FIG. 5 is a diagram illustrating an example of job data.

FIG. 5 is a diagram illustrating an example of the job data. Entire job data 1801 includes process data 1802 and various types of print data 1803 through 1806. The process data 1802 includes description of the job process that is described below with reference to FIG. 8. Each of the various types of print data 1803 through 1806 stores therein print data to be used in the printing process.

FIG. 6 is a diagram illustrating an example of each component of a perfect bound product according to the present exemplary embodiment. The perfect bound product includes: a wrapper band 501 to be provided to the perfect bound product; a dust jacket 502 to be provided to the perfect bound product; a cover 503; a spine area 504; and a main body 505 serving as the entire text.

FIG. 7 is a diagram illustrating print data of the wrapper band 501 and the dust jacket 502 output from the printing apparatus 102. A sheet 601 is output from the printing apparatus 102. The wrapper band 501 on the sheet 601 is an area in which the wrapper band data is arranged, and such an arrangement area is actually used as the wrapper band 501. According to the present exemplary embodiment, that is, the sheet 601 to be output from the printing apparatus 102 has the arrangement area of the wrapper band data inside thereof, and the sheet 601 is cut along the arrangement area, so that the arrangement area of the wrapper band data is actually used. Hereinafter, the arrangement area of the wrapper band data is called a cutting rectangle.

A sheet 602 is output from the printing apparatus 102. The dust jacket 502 on the sheet 602 is an area in which the dust jacket data is arranged, and such an arrangement area is actually used as the dust jacket 502. According to the present exemplary embodiment, that is, the sheet 602 to be output from the printing apparatus 102 has the arrangement area of the dust jacket data inside thereof, and the sheet 602 is cut along the arrangement area, so that the arrangement area of the dust jacket data is actually used. Hereinafter, the arrangement area of the dust jacket data is called a cutting rectangle.

Figure 8:
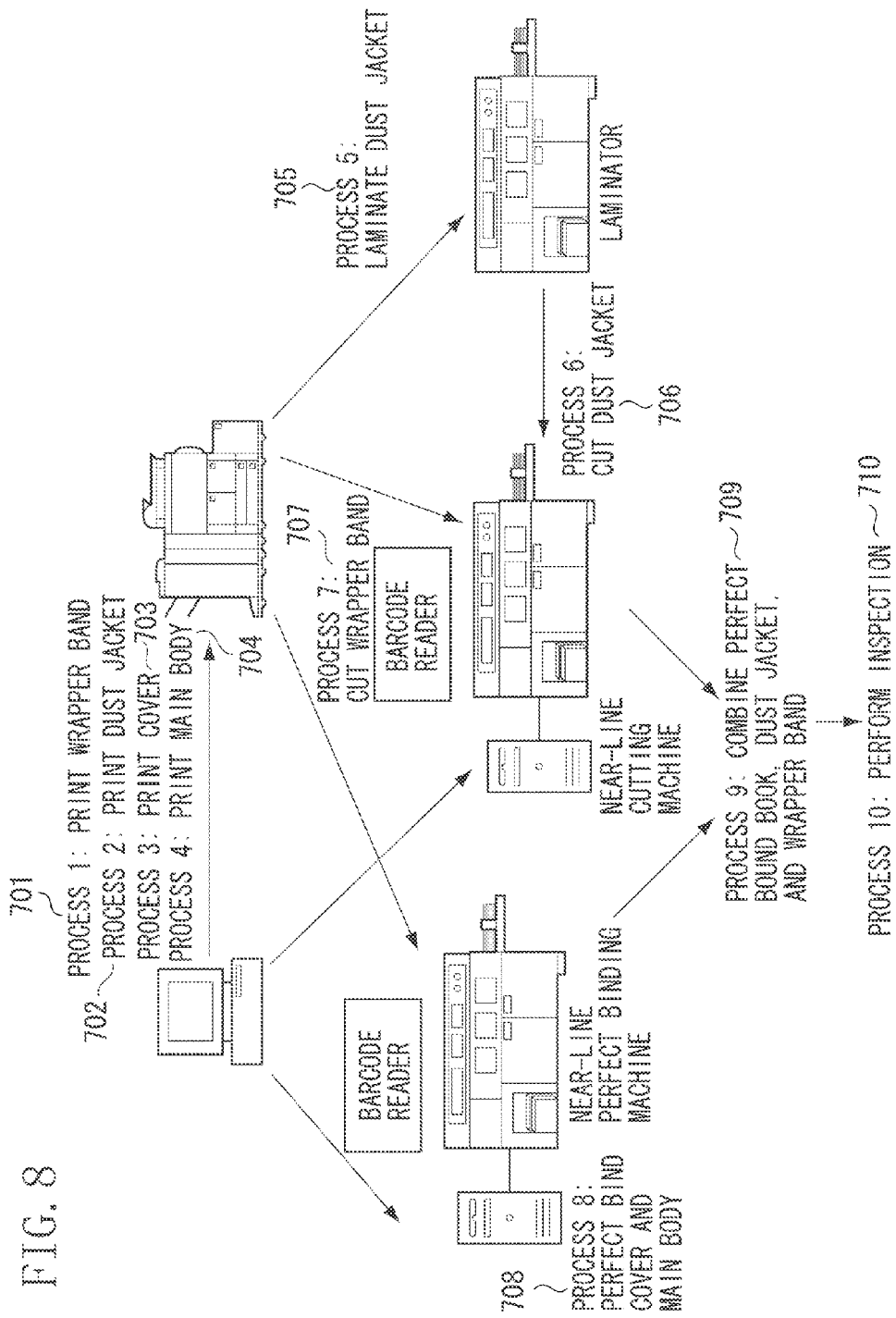
FIG. 8 is a diagram illustrating an example workflow including an information processing apparatus, a printing apparatus, a near-line perfect biding machine, a near-line cutting machine, and a laminator according to a related-art technique.

FIG. 8 is a diagram illustrating an example workflow including an information processing apparatus, a printing apparatus, a near-line perfect biding machine, a near-line cutting machine, and a laminator according to a related-art technique. In FIG. 8, the example workflow illustrates a series of processes to complete a perfect bound product.

In process 1, the information processing apparatus 101 instructs the printing apparatus 102 to print wrapper band data (operation 701). In process 2, the information processing apparatus 101 instructs the printing apparatus 102 to print dust jacket data (operation 702). In process 3, the information processing apparatus 101 instructs the printing apparatus 102 to print cover data (operation 704). In process 4, the information processing apparatus 101 instructs the printing apparatus 102 to print main body data (operation 704).

In process 5, the off-line laminator 109 laminates the dust jacket data printed by operation 702 (operation 705). In process 6, the near-line cutting machine 108 cuts the dust jacket data laminated by operation 705 into the cutting rectangle 502. In step 7, the near-line cutting machine 108 cuts the wrapper band printed by operation 701 into the cutting rectangle 501.

In process 8, the near-line perfect binding machine 105 performs a perfect binding process on the cover data and the main body data printed by respective operations 703 and 704. In process 9, the perfect bound book generated by operation 708, the wrapper band product generated by operation 707, and the dust jacket product generated by operation 706 are combined into a perfect bound product. In process 10, an inspection process is performed (operation 710) to check whether the perfect bound product generated by operation 709 is correctly produced.

Figure 9:
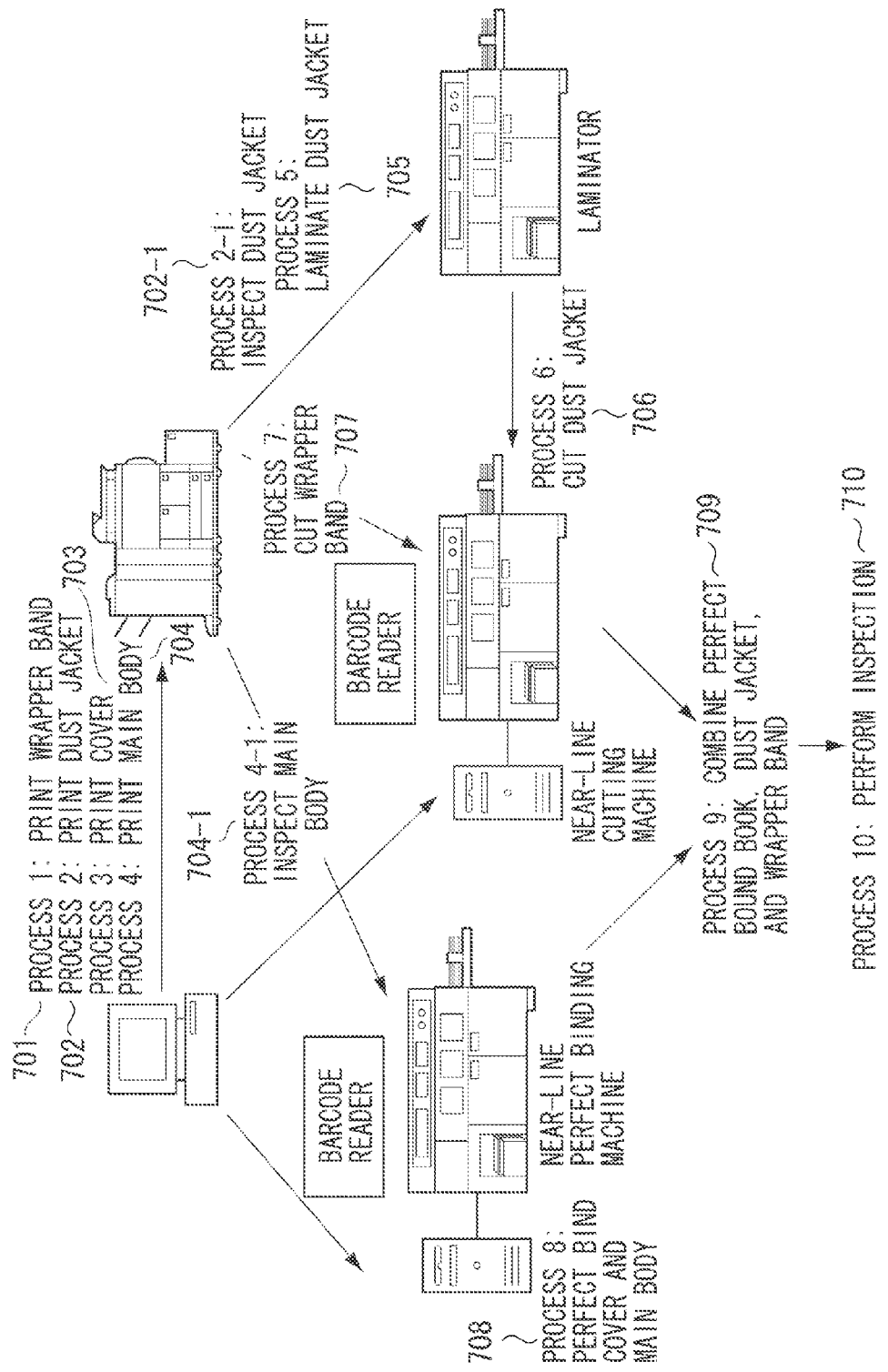
FIG. 9 is a diagram illustrating another example workflow including the information processing apparatus, the printing apparatus, the near-line perfect biding machine, a near-line cutting machine, and a laminator according to the exemplary embodiment.

FIG. 9 is a diagram illustrating another example workflow including the information processing apparatus, the printing apparatus, the near-line perfect biding machine, the near-line cutting machine, and the laminator according to the present exemplary embodiment.

The workflow illustrated in FIG. 9 according to the present exemplary embodiment is similar to that illustrated in FIG. 8 according to the related-art technique except for additional process 2-1 and process 4-1.

In process 2-1, the dust jacket printed by process 2 is inspected (operation 702-1). In process 4-1, the main body printed by process 4 is inspected (operation 704-1).

Figure 10:
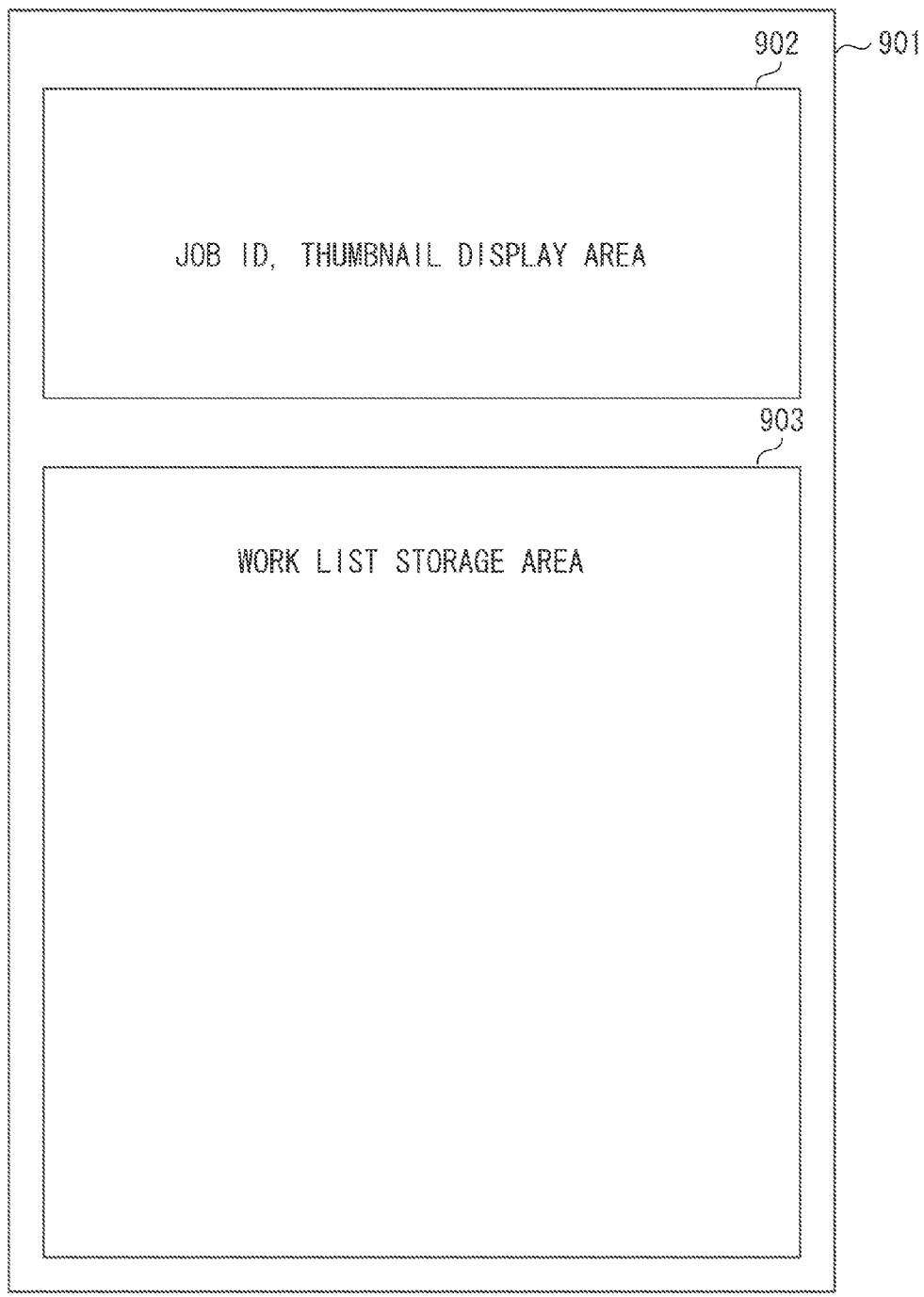
FIG. 10 is a diagram illustrating a layout of a template file serving as original data of a physical job ticket to be output from the printing apparatus.

FIG. 10 is a diagram illustrating a layout of a template file serving as original data of a physical job ticket to be output from the printing apparatus 102. Assume that the template file is stored in the physical job ticket template storage region 405 beforehand. The template file includes: an entire job ticket template 901; a job ID and thumbnail display area 902 in which an job ID and a thumbnail are displayed with respect each component; and a work list storage area 903 in which a process to be performed by an operator is described.

Figure 11:
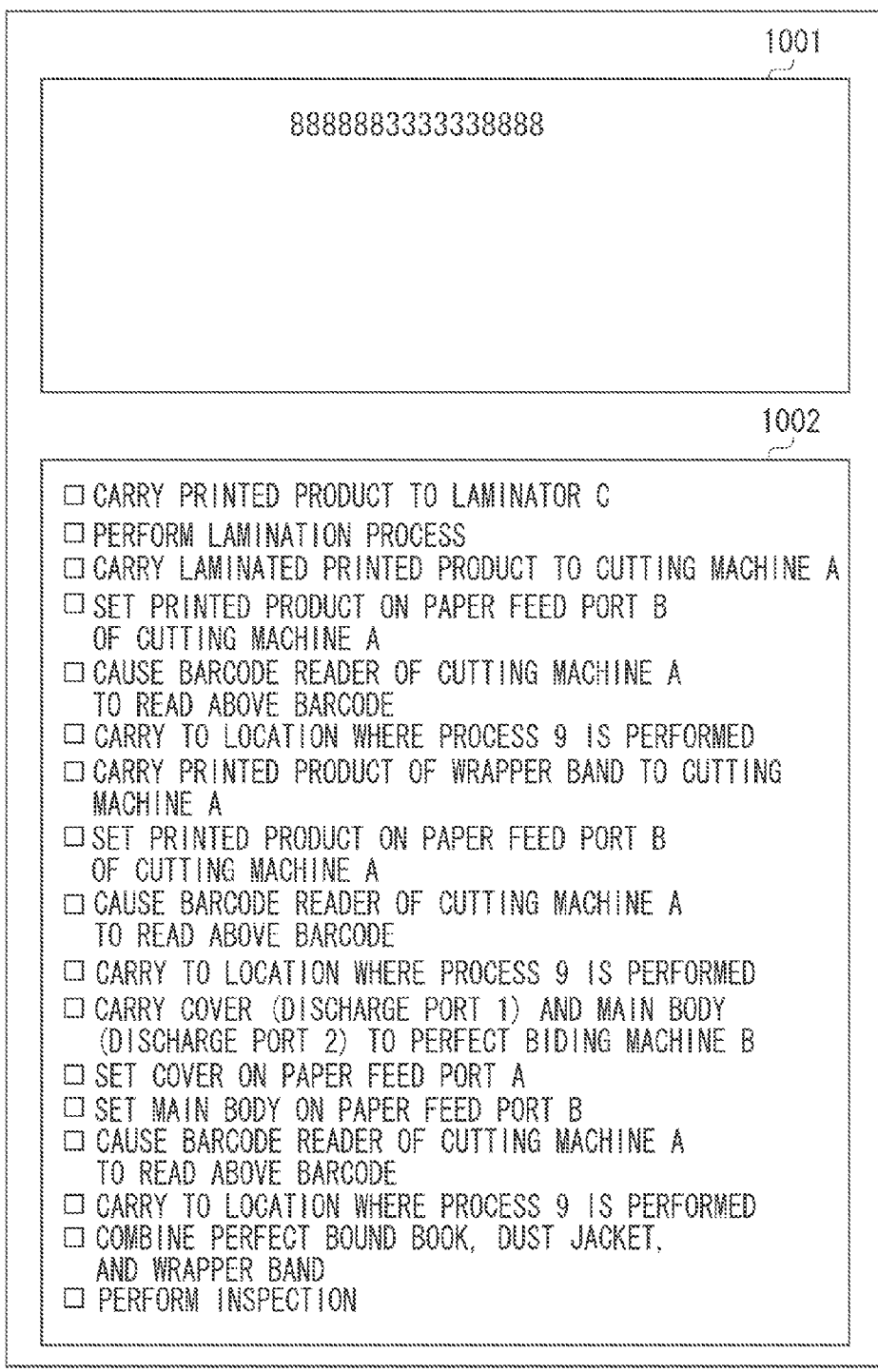
FIG. 11 is a diagram illustrating an example case where the physical job ticket template illustrated in FIG. 10 is used in a related-art technique.

FIG. 11 is a diagram illustrating an example case where the physical job ticket template illustrated in FIG. 10 is used in a related-art technique. A job ID and thumbnail display area 1001 includes a job ID stated therein. A work list storage area 1002 includes a description of processes such as a lamination process, a cutting process, and a perfect binding process to be performed after printing process. Herein, the contents of the description in the work list storage area 1002 include the processes described above with reference to FIG. 8.

Figure 12:
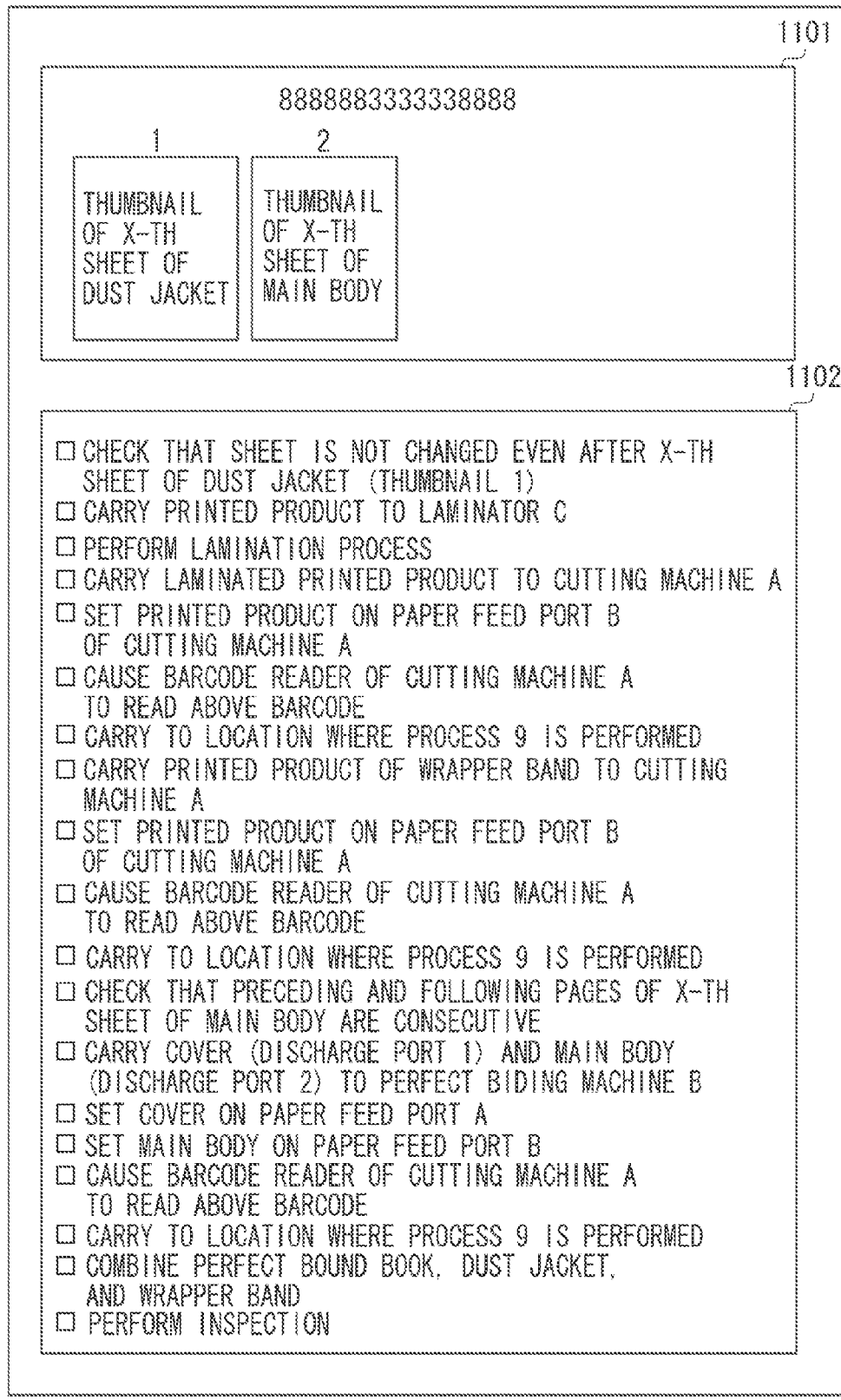
FIG. 12 is a diagram illustrating an example case where the physical job ticket template illustrated in FIG. 11 is used in the exemplary embodiment.

FIG. 12 is a diagram illustrating an example case where the physical job ticket template illustrated in FIG. 11 is used in the present exemplary embodiment. A job ID and thumbnail display area 1101 includes a job ID and a thumbnail of a specific page stated therein. A work list storage area 1102 includes a description of processes such as a lamination process, a cutting process, and a perfect binding process to be performed after printing process, and a description of an inspection process that is added during a process.

Figure 13:
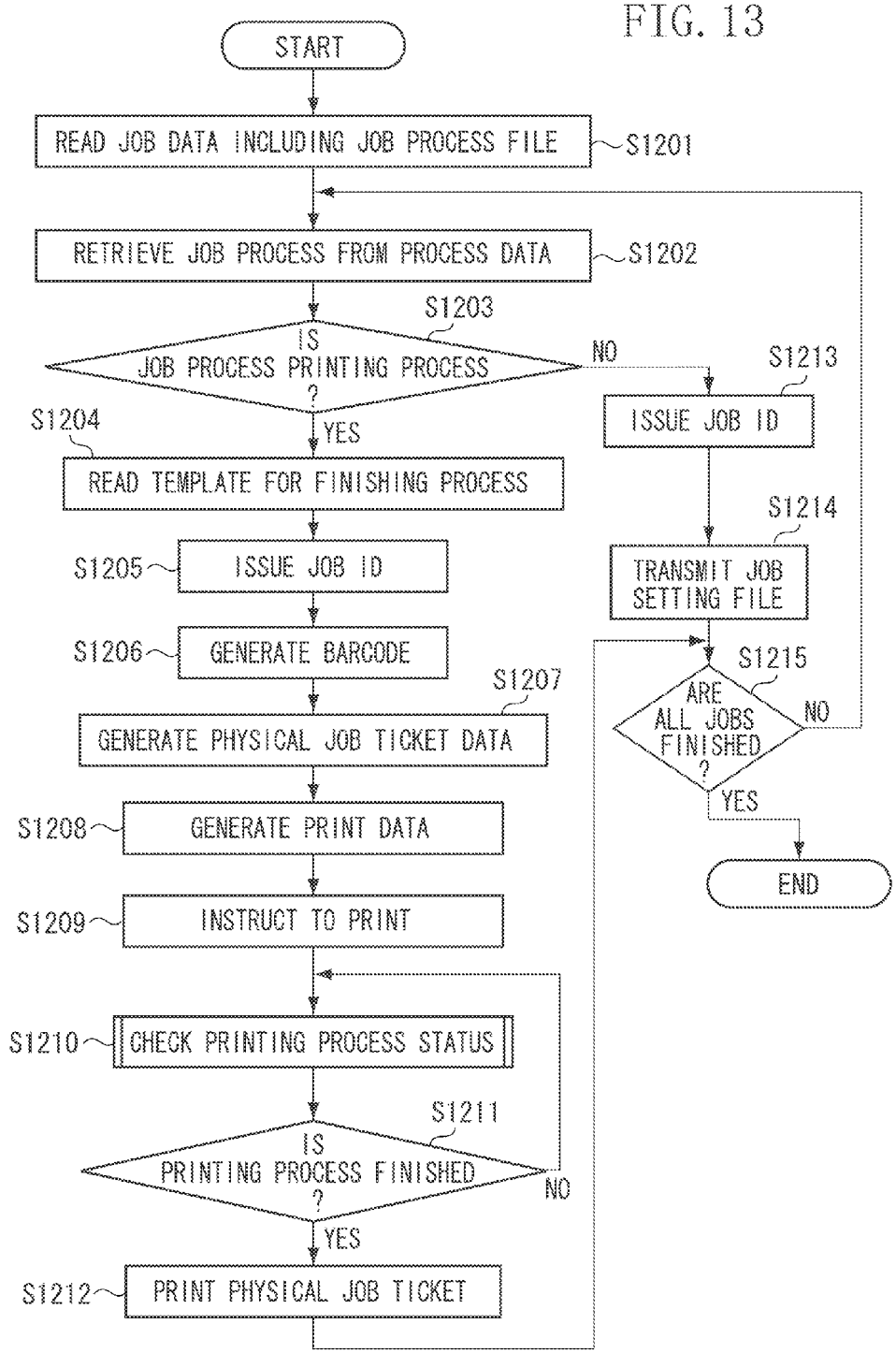
FIG. 13 is a flowchart illustrating an example of a finisher control process according to the exemplary embodiment.

FIG. 13 is a flowchart illustrating an example of a finisher control process according to the present exemplary embodiment.

In step S1201, the job data management unit 402 reads the job data 401 storing therein a job process file. In step S1202, the job data management unit 402 sequentially retrieves job processes from the process data 1802.

In step S1203, the job data management unit 402 determines whether the job process retrieved in step S1202 is a printing process. If the retrieved job process is a printing process (YES in step S1203), then in step S1204, the job ticket generation unit 403 reads a template for the finishing process.

In step S1205, the job ticket generation unit 403 issues a job ID. In step S1206, the job ticket generation unit 403 generates a barcode corresponding to the job ID.

In step S1207, the job ticket generation unit 403 arranges the job ID and the finishing process defined by the job process file on the template, thereby generating the physical job ticket illustrated in FIG. 11. In step S1208, the job ticket generation unit 403 generates print data. In step S1209, the job transmitting and receiving unit 404 performs a printing process (print instruction process).

In step S1210, the job ticket generation unit 403 performs a print processing status checking process, which is described below with reference to FIG. 14. In step S1211, the job ticket generation unit 403 determines whether the printing process has been finished. If the printing process is not finished (NO in step S1211), the operation returns to step S1210. If the printing process is finished (YES in step S1211), then in step S1212, the job ticket generation unit 403 allows the printing process (print instruction process) of the generated physical job ticket, and then the operation proceeds to step S1215.

If the retrieved job process is not a printing process (NO in step S1203), that is, the retrieved job process is a finishing process, then in step S1213, the job ticket generation unit 403 issues an job ID. In step S1214, the job transmitting and receiving unit 404 transmits a job setting file to a corresponding near-line finisher.

In step S1215, the job data management unit 402 determines whether all the job processes have been finished. If there is any remaining job (NO in step S1215), the operation returns to step S1202. If all the job processes are finished (YES in step S1215), the operation of the flowchart ends.

Figure 14:
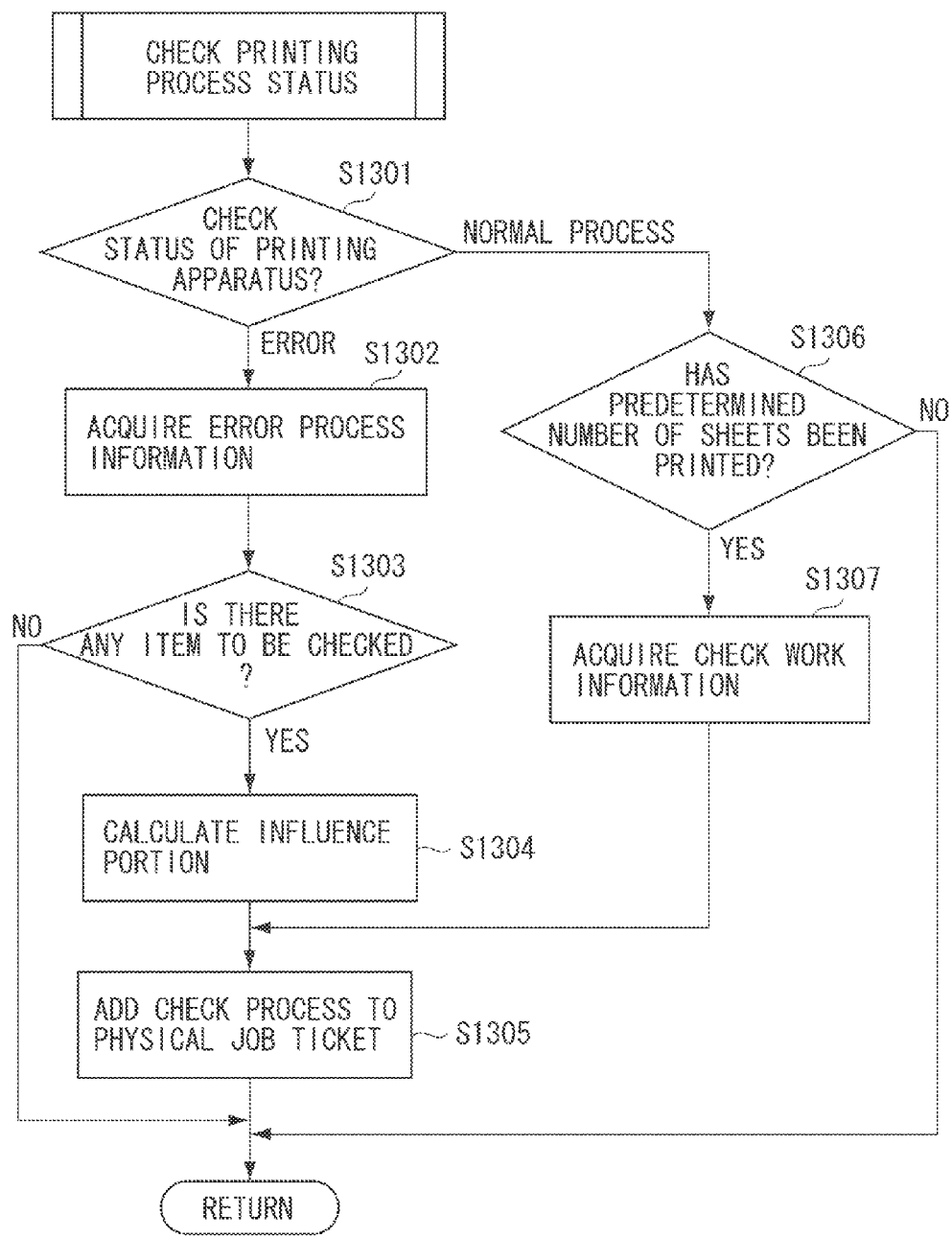
FIG. 14 is a flowchart illustrating an example of a print processing status checking process according to the exemplary embodiment.

FIG. 14 is a flowchart illustrating an example of a print processing status checking process according to the present exemplary embodiment.

In step S1301, the job ticket generation unit 403 acquires status information from the printing apparatus 102 via the job transmitting and receiving unit 404 illustrated in FIG. 4, and checks a processing status of the printing apparatus 102. If the acquired status information indicates an error (ERROR in step S1301), then in step S1302, the job ticket generation unit 403 acquires detailed error handling process information (exception processing information) and awaits a recovery from the error.

In step S1303, the job ticket generation unit 403 determines whether there is any item to be checked before proceeding to a following process. Such determination is described with reference to FIG. 15, which illustrates an example of detailed inspection required conditions 1402.

In the detailed inspection required conditions 1402, conditions of an inspection process to be performed before a following process are defined based on a combination of operation generated during the printing process and the following process with respect to each of the printing processes 1401.

For example, when the printing process is wrapper band printing 1403, the job ticket generation unit 403 determines whether sheets have been replenished during the printing process and a following process is a cutting process based on a condition 1404.

When the printing process is dust jacket printing 1405, the job ticket generation unit 403 determines whether sheets have been replenished during the printing process and a following process is a lamination process based on a condition 1406.

When the printing process is cover printing 1407, the job ticket generation unit 403 determines whether sheets have been replenished during the printing process and a following process is a cutting process based on a condition 1408.

When the printing process is main body printing 1409, the job ticket generation unit 403 determines whether a jam handling process have been performed during the printing process and a following process is a perfect binding process based on a condition 1410. The job ticket generation unit 403 also determines whether toner has been replaced during the printing process and a following process is a perfect binding process based on a condition 1411. Moreover, the job ticket generation unit 403 determines whether calibration has been performed during the printing process and a following process is a perfect binding process based on a condition 1412. The job ticket generation unit 403 also determines whether sheets have been replenished during the printing process and a following process is a perfect binding process based on a condition 1413.

If there is not any item to be checked (NO in step S1303), the operation of the flowchart is returned. If there is any item to be checked (YES in step S1303), then in step S1304, the job ticket generation unit 403 calculates an influence portion. The calculation of the influence portion varies depending on the content of an error handling process. Such calculation is described with reference to FIG. 16.

FIG. 16 is a diagram illustrating processing contents 1501 and additional work (check operation) contents 1502. The processing contents 1501 includes a content of operation to be generated in the printing process, whereas the additional work contents 1502 includes a content of a work (operation) to be added to the physical job ticket in response to a process of the processing contents 1501. In FIG. 16, information that specifies a portion to be checked and a content of a check operation are defined according to the processing content.

For example, when a jam handling process 1503 is performed in the printing process, the job ticket generation unit 403 acquires information about what number-th sheet is jammed from the printing apparatus 102. Accordingly, the job ticket generation unit 403 determines a check operation 1504 as a check operation to be added to the physical job ticket. The check operation 1504 checks that preceding and following sheets of the jammed sheet of a printed product are not missing. In addition, the job ticket generation unit 403 retrieves paper type information on paper used for the printing process from the print data. For example, FIG. 17 illustrates information that defines a paper type 1601 and a paper thickness 1602. The job ticket generation unit 403 extracts the corresponding paper thickness information from the information illustrated in FIG. 17 based on the retrieved paper type information. According to the information illustrated in FIG. 17, for example, coated paper 1603 has a thickness of 0.09 mm, mat paper 1605 has a thickness of 0.115 mm, and a high quality paper 1607 has a thickness of 0.13 mm. Based on the information of the relevant sheet number of the printed product and the information of the paper thickness, the job ticket generation unit 403 calculates an approximate distance (mm) between a top of the printed product and a portion that is required to be checked.

When toner replacement 1505 is performed in the printing process, the job ticket generation unit 403 acquires information about the number of sheets that have been printed before the toner replacement from the printing apparatus 102. Accordingly, the job ticket generation unit 403 determines a check operation 1506 as a check operation to be added to the physical job ticket. The check operation 1506 checks that preceding and following sheets of the relevant sheet of the printed product (or approximate distance (mm) from the top of the printed product) have substantially no color change.

When calibration 1507 is performed in the printing process, the job ticket generation unit 403 acquires information about the number of sheets that have been printed before the calibration from the printing apparatus 102. Accordingly, the job ticket generation unit 403 determines a check operation 1508 as a check operation to be added to the physical job ticket. The check operation 1508 checks that preceding and following sheets of the relevant sheet number of the printed product (or approximate distance (mm) from the top of the printed product) have substantially no color change.

When sheet replenishment 1509 is performed in the printing process, the job ticket generation unit 403 acquires information about the number of sheets that have been printed before the sheet replenishment from the printing apparatus 102. Accordingly, the job ticket generation unit 403 determines a check operation 1510 as a check operation to be added to the physical job ticket. The check operation 1510 checks that paper is not changed between preceding and following sheets of the relevant sheet number of the printed product (or approximate distance (mm) from the top of the printed product).

The above determination process of step S1304 is an example of a first determination process.

In step S1305, the job ticket generation unit 403 adds the check operation to the physical job ticket, and then the operation of the flowchart is returned. In the physical job ticket, the influence portion and the contents of the check operation as illustrated in FIG. 16 or 18 are stated. The job ticket generation unit 403 extracts print data of the relevant page and generates a thumbnail image, so that the thumbnail image is displayed on the display area 902 illustrated in FIG. 10. In the example physical job ticket illustrated in FIG. 12, the check operation and the thumbnail are added.

If the acquired status information indicates a normal process (NORMAL PROCESS in step S1301), then in step S1306, the job ticket generation unit 403 determines whether a predetermined number of sheets have been printed from a previous check, which is described with reference to FIG. 18.

FIG. 18 is a diagram illustrating an example of information that defines an item to be checked regularly during the printing process. In the information illustrated in FIG. 18, regular check conditions 1701 and additional works 1702 are defined. The additional works 1702 are check operations to be added to a physical job ticket when the regular check conditions 1701 are satisfied.

For example, the job ticket generation unit 403 stores therein the cumulative number of pages that have been printed from previous calibration. The job ticket generation unit 403 determines whether W pages printing 1703 has been performed based on the cumulative number of printed pages stored therein. Moreover, the job ticket generation unit 403 stores therein the cumulative number of pages that have been printed from a previous color change check. The job ticket generation unit 403 determines whether W pages printing 1705 has been performed based on the cumulative number of printed pages stored therein. In addition, the job ticket generation unit 403 stores therein the cumulative number of pages that have been printed from previous replacement of Z-toner. The job ticket generation unit 403 determines whether W pages printing 1707 has been performed based on the cumulative number of printed pages stored therein. Assume that the reference character "W" defines a value that is set beforehand according to the quality and performance of the printing apparatus 102.

If the predetermined number of sheets has not been printed yet (NO in step S1306), the operation of the flowchart is returned. If the predetermined number of sheets have been printed (YES in step S1306), then in step S1307, the job ticket generation unit 403 acquires information of check operations (e.g., 1704, 1706, and 1708 in FIG. 18). Subsequently, the operation proceeds to step S1305.

More Specifically, if the W pages printing 1703 has been performed from previous calibration (YES in step S1306), then in step S1307, the job ticket generation unit 403 determines a check operation 1704 as a check operation to be added to a physical job ticket. The check operation 1704 checks that preceding and following pages of an X-th sheet serving as a relevant page in this job (or approximate distance (mm) from the top of the printed product) have substantially no color change. Alternatively, if the W pages printing 1705 has been performed from a previous color change check (YES in step S1306), then in step S1307, the job ticket generation unit 403 determines the check operation 1706 as a check operation to be added to a physical job ticket. The check operation 1706 checks that preceding and following pages of an X-th sheet serving as a relevant page in this job (or approximate distance (mm) from the top of the printed product) have substantially no color change. Moreover, if the W page printing 1707 has been performed from previous replacement of Z-toner (YES in step S1306), then in step S1307, the job ticket generation unit 403 determines the check operation 1708 as a check operation to be added to a physical job ticket. The check operation 1708 checks that the Z-toner is output on preceding and following pages of an X-th sheet serving as a relevant page in this job (or approximate distance (mm) from the top of the printed product). Assume that the reference character "Z" is a color that is set to be any of yellow, magenta, cyan, and black.

The above determination process in step S1307 is an example of a second determination process.

According to the present exemplary embodiment, as described above, when exception processing such as an error handling process is performed, a check operation is surely performed before a next process. Consequently, even in case of printing error, suppression of reworking processes can be achieved. According to the present exemplary embodiment, moreover, an important check point is available, so that any operator can efficiently perform a check operation, thereby improving work efficiency by reducing the number of unnecessary checks and check errors.

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

In an example, a computer-readable medium may store a program that causes an information processing apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2011-021937 filed Feb. 3, 2011, which is hereby incorporated by reference herein in its entirety.

What is claimed is:

1. An information processing apparatus, comprising:
an acquisition unit configured to acquire error information, from a printing apparatus, indicating an error of the printing apparatus;
a first determination unit configured to determine a check operation to be added to instruction information based on the error information acquired by the acquisition unit, wherein, when acquired error information is first error information, a first check operation is added, and, when acquired error information is second error information, a second check operation is added; and
an output unit configured to output the instruction information including the check operation determined by the first determination unit.

2. The information processing apparatus according to claim 1, further comprising:
a check unit configured to check a processing status of a printing apparatus;
a condition determination unit configured to determine whether a regular check condition is satisfied in response to the processing status checked by the check unit being in execution of a normal process; and
a second determination unit configured to determine a check operation to be added to the instruction information according to the regular check condition in response to the condition determination unit determining that the regular check condition is satisfied,
wherein the output unit outputs the instruction information including the check operation in response to the check operation being determined by the second determination unit.

3. The information processing apparatus according to claim 2, wherein the second determination unit stores therein a cumulative number of printed pages from previous calibration, and determines an operation for checking that preceding and following sheets of a relevant sheet of a printed product have substantially no color change as the check operation to be added in response to the cumulate number of printed pages satisfying the regular check condition.

4. The information processing apparatus according to claim 2, wherein the second determination unit stores therein a cumulative number of printed pages from a previous color check, and determines an operation for checking that preceding and following sheets of a relevant sheet of a printed product have substantially no color change as the check operation to be added in response to the cumulate number of printed pages satisfying the regular check condition.

5. The information processing apparatus according to claim 2, wherein the second determination unit stores therein a cumulative number of printed pages from previous toner replacement, and determines an operation for checking that toner is output on preceding and following sheets of a relevant sheet of a printed product as the check operation to be added in response to the cumulate number of printed pages satisfying the regular check condition.

6. The information processing apparatus according to claim 1, wherein, in response to the error information being a jam handling process, the first determination unit determines an operation for checking that preceding and following sheets of a relevant sheet of a printed product are not missing as the check operation to be added based on information about what number-th sheet is jammed, wherein the information about what number-th sheet is jammed is acquired from the printing apparatus.

7. The information processing apparatus according to claim 1, wherein, in response to the error information being a jam handling process, the first determination unit calculates an approximate thickness between a top of a printed product and a missing page based on information about what number-th sheet is jammed and information about a paper thickness, and then determines an operation for checking whether there is any missing page in a vicinity of the calculated approximate thickness as the check operation to be added, wherein the information about what number-th sheet is jammed and information about a paper thickness is acquired from the printing apparatus.

8. The information processing apparatus according to claim 1, wherein, in response to the error information being toner replacement, the first determination unit determines an operation for checking that preceding and following sheets of a relevant sheet of a printed product have substantially no color change as the check operation to be added based on information about a number of sheets that have been printed before the toner replacement, wherein the information about the number of sheets that have been printed before the toner replacement is acquired from the printing apparatus.

9. The information processing apparatus according to claim 1, wherein, in response to the error information being calibration, the first determination unit determines an operation for checking that preceding and following sheets of a relevant sheet of a printed product have substantially no color change as the check operation to be added based on information about a number of sheets that have been printed before the calibration, wherein the information about a number of sheets that have been printed before the calibration is acquired from the printing apparatus.

10. The information processing apparatus according to claim 1, wherein, in response to the error information being sheet replenishment, the first determination unit determines an operation for checking that paper is not changed between preceding and following sheets of a relevant sheet of a printed product as the check operation to be added based on information about a number of sheets that have been printed before the calibration, wherein the information about a number of sheets that have been printed before the calibration is acquired from the printing apparatus.

11. The information processing apparatus according to claim 1, wherein the output unit outputs the instruction information including the check operation and a thumbnail image of print data of a relevant page.

12. An information processing method to be executed by an information processing apparatus, the information processing method comprising:
- acquiring error information, from a printing apparatus, indicating an error of the printing apparatus;
- determining a check operation to be added to instruction information based on the acquired error, wherein, when acquired error information is first error information, a first check operation is added, and, when acquired error information is second error information, a second check operation is added; and
- outputting the instruction information including the determined check operation.

13. A non-transitory computer-readable medium storing a program that causes an information processing apparatus to execute an information processing method, the method comprising:
- acquiring error information, from a printing apparatus, indicating an error of the printing apparatus;
- determining a check operation to be added to instruction information based on the acquired error, wherein, when acquired error information is first error information, a first check operation is added, and, when acquired error information is second error information, a second check operation is added; and
- outputting the instruction information including the determined check operation.

* * * * *